(12) United States Patent
Jha et al.

(10) Patent No.: US 10,187,256 B2
(45) Date of Patent: Jan. 22, 2019

(54) CONFIGURATION REPLICATION ACROSS DISTRIBUTED STORAGE SYSTEMS

(71) Applicant: NetApp, Inc., Sunnyvale, CA (US)

(72) Inventors: Sudhakar Jha, Bangalore (IN); Reshmi G, Palakkad (IN); Ganesh Marappa, Bangalore (IN); Vineeth Kumar T, Bangalore (IN); Balaji Ramani, Bangalore (IN); Veena T S, Bangalore (IN); Rakshit Karnawat, Bangalore (IN); Prasad V. Srinivas, Bangalore (IN); Harsha Handral Sridhara, Bangalore (IN); Anoop Chakkalakkal Vijayan, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 528 days.

(21) Appl. No.: 14/510,300

(22) Filed: Oct. 9, 2014

(65) Prior Publication Data

US 2016/0105313 A1   Apr. 14, 2016

(51) Int. Cl.
| | |
|---|---|
| G06F 15/16 | (2006.01) |
| H04L 12/24 | (2006.01) |
| G06F 11/14 | (2006.01) |
| H04L 29/08 | (2006.01) |
| G06F 11/20 | (2006.01) |

(52) U.S. Cl.
CPC ...... *H04L 41/0816* (2013.01); *G06F 11/1451* (2013.01); *G06F 11/2069* (2013.01); *H04L 67/1095* (2013.01); *H04L 67/1097* (2013.01); *G06F 11/2071* (2013.01); *G06F 11/2082* (2013.01); *G06F 2201/84* (2013.01)

(58) Field of Classification Search
CPC .................. H04L 41/0819; H04L 67/1097
See application file for complete search history.

(56) References Cited

U.S. PATENT DOCUMENTS

| | | | |
|---|---|---|---|
| 6,453,326 B1 * | 9/2002 | Parham | H04L 67/1095 |
| 7,865,475 B1 | 1/2011 | Yadav et al. | |
| 8,332,497 B1 * | 12/2012 | Gladish | G06F 17/30197 |
| | | | 707/610 |
| 8,380,951 B1 * | 2/2013 | Krinke, II | G06F 11/1458 |
| | | | 711/161 |
| 8,495,178 B1 * | 7/2013 | Jia | G06F 11/1464 |
| | | | 370/235 |

(Continued)

OTHER PUBLICATIONS

Int. Search Report/Written Opinion cited in PCT Application No. PCT/US2015/054843 dated Mar. 17, 2016, 11 pgs.

*Primary Examiner* — Moustafa M Meky
*Assistant Examiner* — SM Z Islam
(74) *Attorney, Agent, or Firm* — Cooper Legal Group, LLC

(57) ABSTRACT

A method includes receiving a change in a primary configuration of a primary storage node while the primary storage node is operational, wherein primary data stored in the primary storage node is to be backed up as backup data in a backup storage node. The method includes locating at least one identifier in the change that identifies the primary storage node. The method includes replacing the at least one identifier in the change that identifies the primary storage node with an identification of the backup storage node to create an updated configuration change. The method includes updating a backup configuration of the backup storage node based on the updated configuration change.

20 Claims, 12 Drawing Sheets

(56) References Cited

U.S. PATENT DOCUMENTS

| | | | |
|---|---|---|---|
| 2006/0023627 A1* | 2/2006 | Villait | G06F 11/2025 370/222 |
| 2006/0053216 A1* | 3/2006 | Deokar | G06F 21/6218 709/223 |
| 2008/0034005 A1* | 2/2008 | Satoyama | G06F 3/0617 |
| 2014/0146705 A1* | 5/2014 | Luxenberg | H04L 45/586 370/254 |
| 2015/0304450 A1* | 10/2015 | van Bemmel | H04L 12/4641 709/217 |

* cited by examiner

CONFIGURATION REPLICATION ACROSS DISTRIBUTED STORAGE SYSTEMS

BACKGROUND

Aspects generally relate to the field of distributed storage, and, more particularly, to distributed storage of data that includes a redundant configuration having a backup for a primary storage.

Whether maintaining customer data or their own data, businesses require always available or highly available data and protection of that data. To support these requirements, data often resides across multiple storage systems in multiple sites that are often great distances apart. One reason these sites are separated by great distances is to prevent a single catastrophe impacting data availability. Metrics used to define the availability requirements include recovery point objective (RPO) and recovery time objective (RTO). A business specifies an RTO as the maximum amount of time that the business tolerates lack of access to the business' data. A business specifies an RPO as the amount of data in terms of time that can be lost due to an interruption. For instance, a business can specify an RTO as 15 seconds. In other words, the business will accept at most 15 seconds from the time of a service interruption or failure to the time their data is again available. For an RPO, a business can specify five seconds. That means that the business will not accept losing any more than the data written (e.g., new writes, updates, etc.) in the 5 seconds that precede a failure or interruption.

Known storage features for supporting the availability and protection demands of businesses across storage systems include snapshotting, mirroring, cloning, and replicating. Each of these storage features can also vary by the provider of the storage feature and/or storage product. Despite the variations, each storage feature provides a consistent view of a business' data.

In one such configuration, data stored in a primary storage device can be replicated in a backup storage device. The primary storage device and the backup storage device can be in different clusters and can also be in different networks. If the configuration of the primary storage device is not protected and unrecoverable when the primary storage device fails, the RTO can be adversely affected because the backup storage device needs to be reconfigured before serving data.

BRIEF DESCRIPTION OF THE DRAWINGS

The present aspects may be better understood, and numerous objects, and advantages made apparent to those skilled in the art by referencing the accompanying drawings.

DESCRIPTION OF EXAMPLE ILLUSTRATIONS

Figure 1:
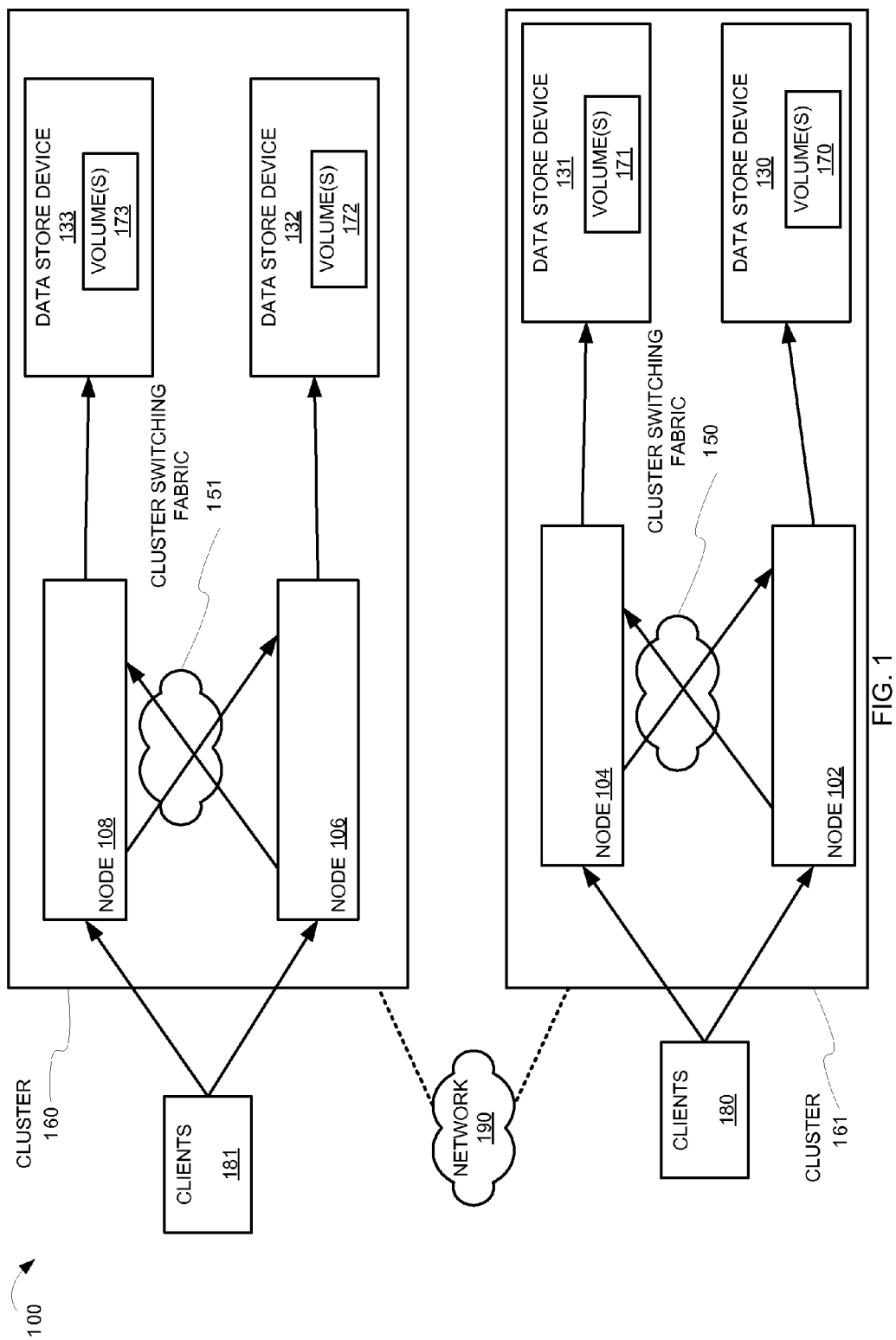
FIG. 1 depicts a distributed storage system having distributed configuration replication, according to some features.

The description that follows includes example systems, methods, techniques, instruction sequences and computer program products that includes techniques of the features described herein. However, it is understood that the described features may be practiced without these specific details. In instances, well-known instruction instances, protocols, structures and techniques have not been shown in detail in order not to obfuscate the description.

Overview

Data can be stored across different storage nodes in devices or clusters communicatively coupled together. Some aspects can also include redundant storage of the configuration of the storage nodes. Thus, the configuration of a primary storage node can be replicated along with the data in a backup storage node. Some aspects can redundantly create and store an initial baseline of the configuration for the backup storage node. The initial baseline for the backup storage node can be derived from the configuration of the primary storage node ("the primary configuration"). Also during operations, any incremental changes to the primary configuration may be transmitted to the backup storage node. The backup storage node can then update its configuration based on these incremental changes. The primary configuration is mirrored at the backup storage node, enabling consistent client interfacing to access the likewise mirrored data. Therefore, the clients can remain essentially unaffected when the primary storage node becomes nonoperational and the backup storage node is activated.

According to some aspects, the primary configuration is not copied directly as the configuration for the backup storage node ("backup configuration"). In particular, the primary storage node and the backup storage node can be in different clusters and/or different networks. Thus, a direct copy of primary configuration to the backup storage node can create a conflict with existing configurations of other storage nodes in the cluster that includes the backup storage node. Therefore according to some aspects, replicating the primary configuration to the backup storage node can include filtering to replace and/or delete primary configuration data that is specific to the cluster and/or the network to which the primary storage node belongs.

Examples of configuration data for a storage node can include identities of storage volumes, types of protocols (e.g., NFS, CIS, etc.), types of encryptions and security, the number and types of network interfaces and routes, etc. In some aspects, replication of incremental configuration changes are synchronously updated at the backup storage node. For synchronous updates, incremental configuration changes are received and updated at the backup storage node after the incremental changes are made in the configuration at the primary storage node. In some other aspects, replication of incremental configuration changes are asynchronously updated at the backup storage node. For asynchronous updates, incremental configuration changes are received at the backup storage node, but the configuration at the backup storage node is periodically updated. Accordingly, for asynchronous updates, a number of incremental changes can accumulate at the backup storage node. After a time period has expired, the configuration at the backup storage node can then be updated based on these number of incremental changes.

Figure 3:
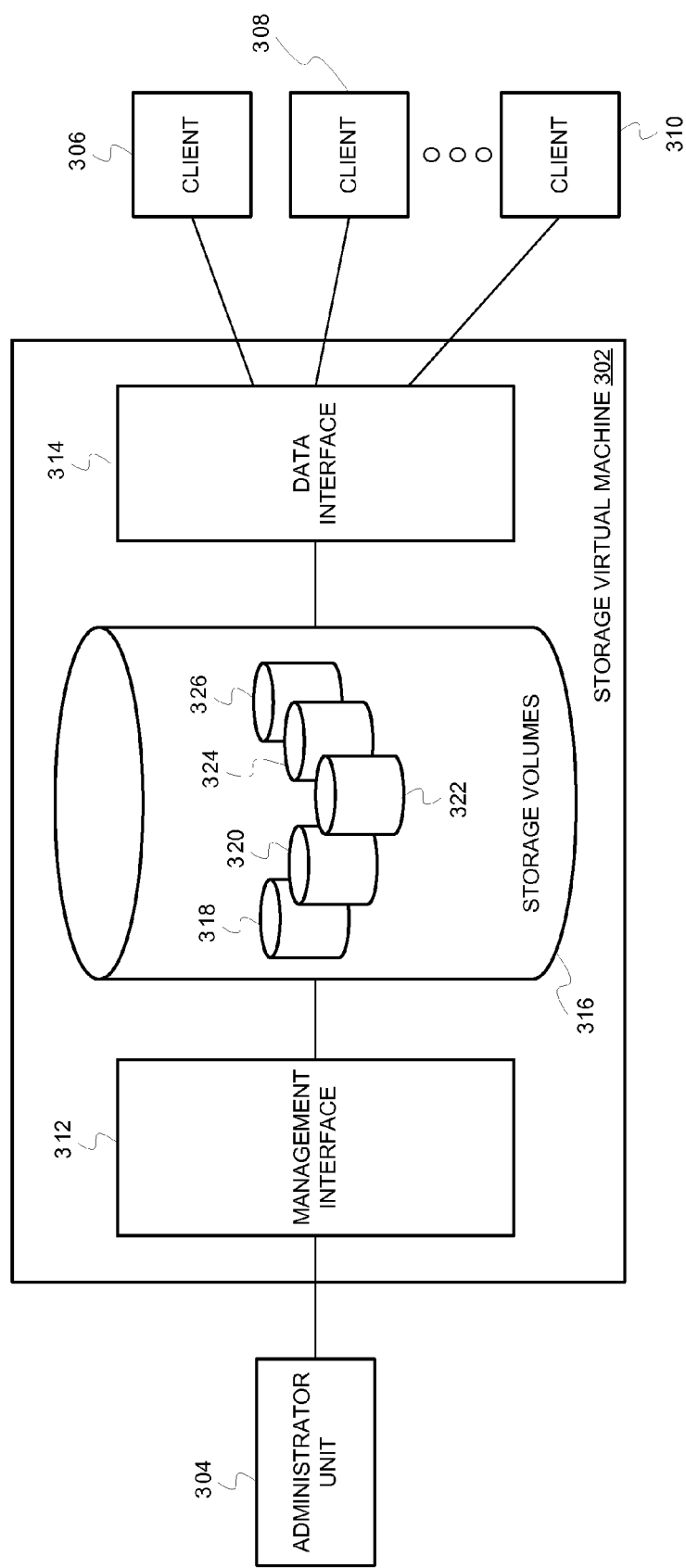
FIG. 3 depicts a block diagram of an example storage virtual machine (SVM), according to some features.

A storage node can be any type of storage device(s) in varying configurations for storing data into and retrieving data from. For example, a storage node can be a Storage Virtual Machine (SVM) that can contain one or more data volumes and one or more interfaces for serving data to clients. An example of an SVM is depicted in FIG. 3, which is described in more detail below. Also, the storage node can be multiple storage devices stored in one or more storage clusters. For example, the attributes of a storage cluster can be virtualized and divided among multiple SVMs. An SVM can contain one or more data volumes and network interfaces. An SVM can securely isolate the shared virtualized data storage and network and can appear as a single dedicated server to its clients. Each SVM can have a separate administrator authentication domain and can be managed independently by an SVM administrator. Also, multiple SVMs can coexist in a single cluster without being bound to any node in a cluster. However, the SVMs can be bound to the physical cluster on which they exist.

Example System

Figure 2:
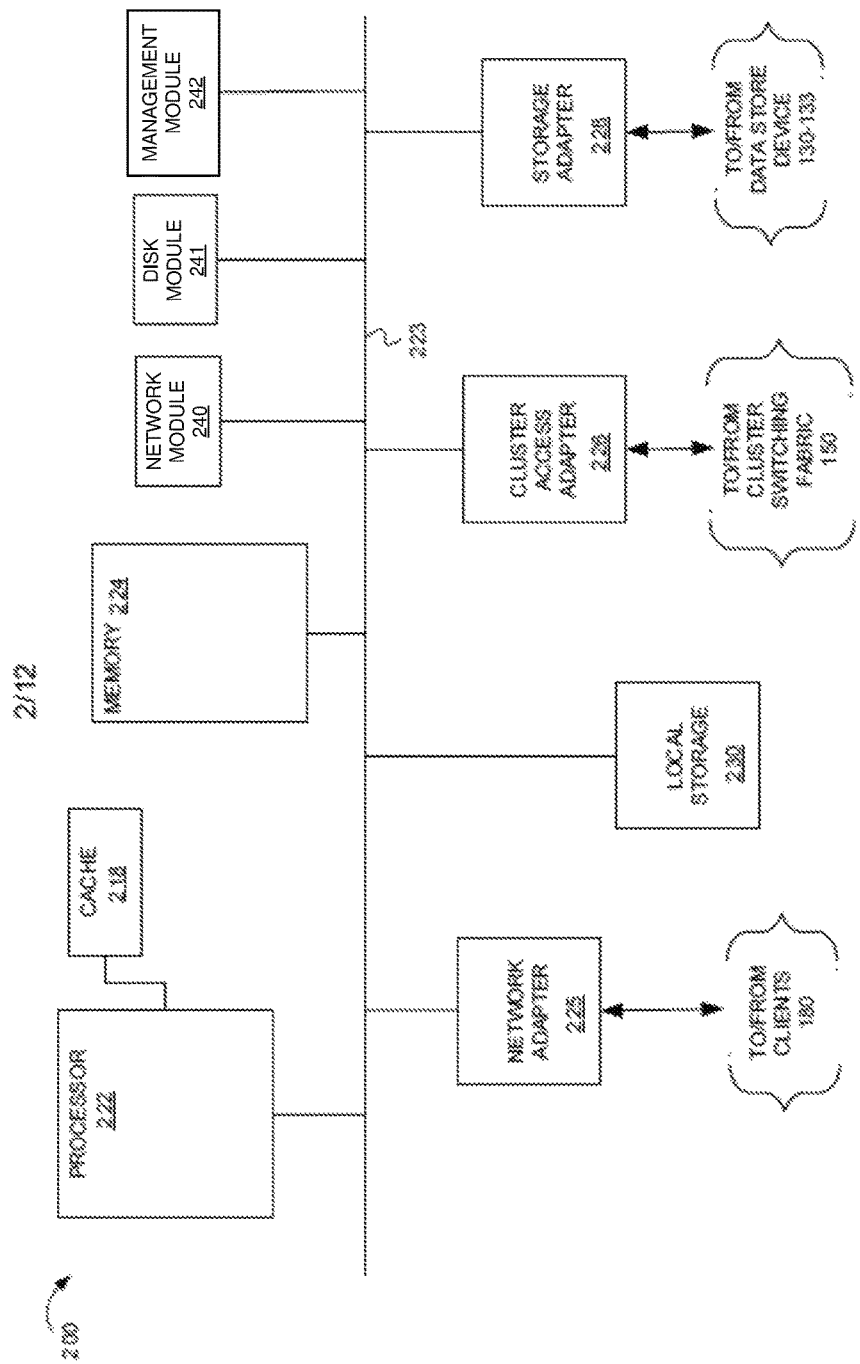
FIG. 2 depicts a block diagram of a node in a distributed storage system, according to some features.

FIG. 1 depicts a distributed storage system having distributed configuration replication, according to some features. FIG. 1 depicts a system 100 that includes multiple clusters (a cluster 160 and a cluster 161). Each cluster can include a number of nodes interconnected that can be configured to provide storage service for data containers or objects (e.g., files) across one or more data volumes. In this example, the cluster 160 includes a node 102 and a node 104 interconnected through a cluster switching fabric 150. The cluster 161 includes a node 106 and a node 108 interconnected through a cluster switching fabric 151. The cluster switching fabric 150 and the cluster switching fabric 151 can Gigabit Ethernet switches. The nodes 102-108 include various functional components that cooperate to provide a distributed storage system architecture of the cluster. An example of the nodes 102-108 is depicted in FIG. 2, which is described in more detail below.

The nodes 102-104 can be communicatively coupled to clients 180 (e.g., over a network). Similarly, the nodes 106-108 can be communicatively coupled to client 181 (e.g., over a network). The node 102 is communicatively coupled to store and retrieve data into and from a data store device 130. The node 104 is communicatively coupled to store and retrieve data into and from a data store device 131. The node 106 is communicatively coupled to store and retrieve data into and from a data store device 132. The node 108 is communicatively coupled to store and retrieve data into and from a data store device 133.

The clients 180 and the clients 181 may be general-purpose computers configured to interact with the nodes 102-104 and the nodes 106-108, respectively, in accordance with a client/server model of information delivery. That is, each of the clients 180 may request the services of the nodes 102-104, and each of the clients 181 may request the services of the nodes 106-108. The nodes 102-108 may return the results of the services requested by the clients 180-181, by exchanging packets over a network. The clients 180-181 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the clients 180-181 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

According to some features, data store devices 130-133 include volumes, which are components of storage of information in disk drives, disk arrays, and/or other data stores (e.g., flash memory) as a file-system for data, for example. In this example, the data store device 130 includes volume(s) 170. The data store device 131 includes volume(s) 171. The data store device 132 includes volume(s) 172. The data store device 133 includes volume(s) 173. According to some features, volumes can span a portion of a data store, a collection of data stores, or portions of data stores, for example, and typically define an overall logical arrangement of file storage on data store space in the distributed file system. According to some features, a volume can comprise stored data containers (e.g., files) that reside in a hierarchical directory structure within the volume. Volumes are typically configured in formats that may be associated with particular file systems, and respective volume formats typically comprise features that provide functionality to the volumes, such as providing an ability for volumes to form clusters. For example, where a first file system may utilize a first format for their volumes, a second file system may utilize a second format for their volumes.

The volumes can include a collection of physical storage disks cooperating to define an overall logical arrangement of volume block number (VBN) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID configurations, such as a RAID-4 level configuration, enhance the reliability/integrity of data storage through the redundant writing of data "stripes" across a given number of physical disks in the RAID group, and the appropriate storing of parity information with respect to the striped data. An illustrative example of a RAID configuration is a RAID-4 level configuration, although it should be understood that other types and levels of RAID configurations may be used in accordance with some features.

The system 100 also includes a network 190 such that nodes in one cluster can communicate with nodes in a different cluster through the network 190. In an example, the cluster 160 can be on a different network than the cluster 161. In another example, the cluster 160 and the cluster 161 are on a same network. According to some features, a node in one cluster is defined as a backup to a node in a different cluster. For example, the node 102 in the cluster 161 can be a primary storage device, and the node 106 in the cluster 160 can be a backup storage device for the node 102. Therefore, data stored in the data store device 130 can be duplicated in the data store device 132. Accordingly, if the node 102 were to become nonoperational, the node 102 would become inactive and the node 106 can become active to process data requests for data stored in the data store device 132. According to some features, the configuration of a node 102 and the data store device 130 can be replicated along with the data. Some aspects can redundantly create and store an initial baseline of the configuration for the node 106 and the data store device 132 (the backup storage node). The initial baseline for the backup storage node can be derived from the configuration of the node 102 and the data store device 130 (the primary storage node). Also during operations, any incremental changes to the configuration of the primary storage node can be transmitted to the secondary storage node. The secondary storage node can then update its configuration based on these incremental changes.

According to some aspects, the configuration of the primary storage node is not copied directly as configuration for the backup storage node. In particular, the primary storage node and the second storage node can be in two different clusters and/or two different networks. Thus, a direct copy of configuration to the backup storage node can create a conflict with already existing configuration with other storage nodes in the cluster that includes the backup storage node. Therefore according to some aspects, replication of the configuration to the backup storage node includes a filtering to replace and/or delete data in the configuration that is specific to the cluster and/or the network where the primary storage node is located.

FIG. 2 depicts a block diagram of a node in a distributed storage system, according to some features. In particular, FIG. 2 depicts a node 200 which can be representative of the nodes 102-108 of FIG. 1. The node 200 includes a processor 222, a memory 224, a network adapter 225, a cluster access adapter 226, a storage adapter 228, an Network Module 240, a Disk Module 241, an Management Module 242, and a local storage 230 interconnected by a system bus 223. Also, the processor 222 is coupled to a cache 218.

The Network Module 240, the Disk Module 241, and the Management Module 242 can be hardware, software, firmware, or a combination thereof. For example, the Network Module 240, the Disk Module 241, and the Management Module 242 can be software executing on the processor 222. The Network Module 241 includes functionality that enables the node 200 to connect to clients over a network. The Disk Module 241 includes functionality to connect to one or more storage devices (e.g., data store devices 130-133). It should be noted that while there is shown an equal number of Network and Disk Modules in the illustrative cluster, there may be is differing numbers of Network and/or Disk Modules in accordance with some features. The Management Module 242 include functionality for managing the node 200. For example, the Management Module 242 can include functionality to update configuration of the node 200 and its associated data store device. Operations for updating the configuration of the node 200 and its associated data store device are depicted in FIGS. 3-9 (which are described in more detail below).

The local storage 230 includes one or more storage devices, such as disks, for storage of local data by the node 200. The cluster access adapter 226 includes a number of ports adapted to couple the node 200 to other nodes of the system 100. In some examples, Ethernet can be used as the clustering protocol and interconnect media. In some examples, where the Network Modules and Disk Modules are implemented on separate storage systems or computers, the cluster access adapter 226 is used by the Network/Disk Module for communicating with other Network/Disk Modules in the system 100.

Each node 200 can be in a single or dual processor storage system executing a storage operating system that implements a high-level module, such as a file system, to logically organize the information as a hierarchical structure of named directories, files and special types of files called virtual disks (or generally "objects" or "data containers") on the disks. However, it will be apparent to those of ordinary skill in the art that the node 200 may alternatively comprise more than two processors. One processor 222 can execute the functions of the Network Module 240, while another processor 222 can execute the functions of the Disk Module 241.

The memory 224 includes storage locations that are addressable by the processors and adapters for storing software program code and data structures, in accordance with some features. The processor and adapters may, in turn, comprise processing elements and/or logic circuitry configured to execute the software code and manipulate the data structures.

The network adapter 225 includes a number of ports adapted to couple the node 200 to one or more clients 180 over point-to-point links, wide area networks, virtual private networks implemented over a public network (Internet) or a shared local area network. The network adapter 225 thus may include the mechanical, electrical and signaling circuitry needed to connect the node 200 to the network. Illustratively, the network may be an Ethernet network or a Fibre Channel (FC) network. Each client 180 may communicate with the node 200 by exchanging discrete frames or packets of data according to pre-defined protocols, such as TCP/IP.

The storage adapter 228 can cooperate with a storage operating system executing on the node 200 to access information requested by the clients. The information may be stored on any type of attached array of writable storage device media such as video tape, optical, DVD, magnetic tape, disks, bubble memory, electronic random access memory, micro-electro mechanical and any other similar media adapted to store information, including data and parity information. The storage adapter 228 can include a number of ports having input/output (I/O) interface circuitry that couples to the disks over an I/O interconnect arrangement, such as a conventional high-performance, FC link topology.

FIG. 3 depicts a block diagram of an example SVM, according to some features. A SVM 302 includes a number of storage volumes 316 (e.g., a storage volume 318, a storage volume 320, a storage volume 322, a storage volume 324, and a storage volume 326). The storage volumes 316 can include one or more storage volumes for the storage of data. The SVM 302 includes a management interface 312 and a data interface 314. The SVM 302 can serve data to clients 306-310 through the data interface 314. The data interface 314 can represent one or different types of interfaces to allow the clients 306-310 to write to and read data from the SVM 302. For example, the data interface 314 can be configured to process interface request according to the Common Internet File System (CIFS) protocol or Network File System (NFS) protocol, over the Transmission Control Protocol/Internet Protocol (TCP/IP) when accessing information in the form of files and directories, internet Small Computer System Interface (iSCSI), etc.

The SVM 302 provides a virtualized data storage that can be shared by multiple clients (the clients 306-310). Thus, the SVM 302 securely isolates the shared virtualized data storage and network and appears as a single dedicated server to its clients. The SVM 302 can include a separate administrator authentication domain and can be managed independently by an SVM administrator. In this example, an administrator unit 304 can manage the SVM 302 through the management interface 312. As shown in FIG. 1 by the storage nodes, multiple SVMs can coexist in a single cluster without being bound to any node in a cluster. However, the SVMs can be bound to the physical cluster on which they exist.

Example Synchronous Configuration Update Operations

Various operations are now described with reference to flowcharts depicted in FIGS. 4-12. FIGS. 4-7 depict operations for synchronous updating of configuration such that a change in configuration at the primary storage node is transmitted to the backup storage node after the configuration change occurs at the primary storage node (at or near real time). In contrast, FIGS. 8-12 depict operations for asynchronous updating of configuration such that changes in configuration at the primary storage node are transmitted to the backup storage node as the change occurs (at or near real time) but are periodically applied at the backup storage node. Therefore for asynchronous updating of configuration, application of a configuration update to the backup storage node may be delayed until the next periodic configuration update. Thus, for asynchronous updating of configurations, updates to the configuration of the secondary storage node occur at some periodic intervals.

Figure 4:
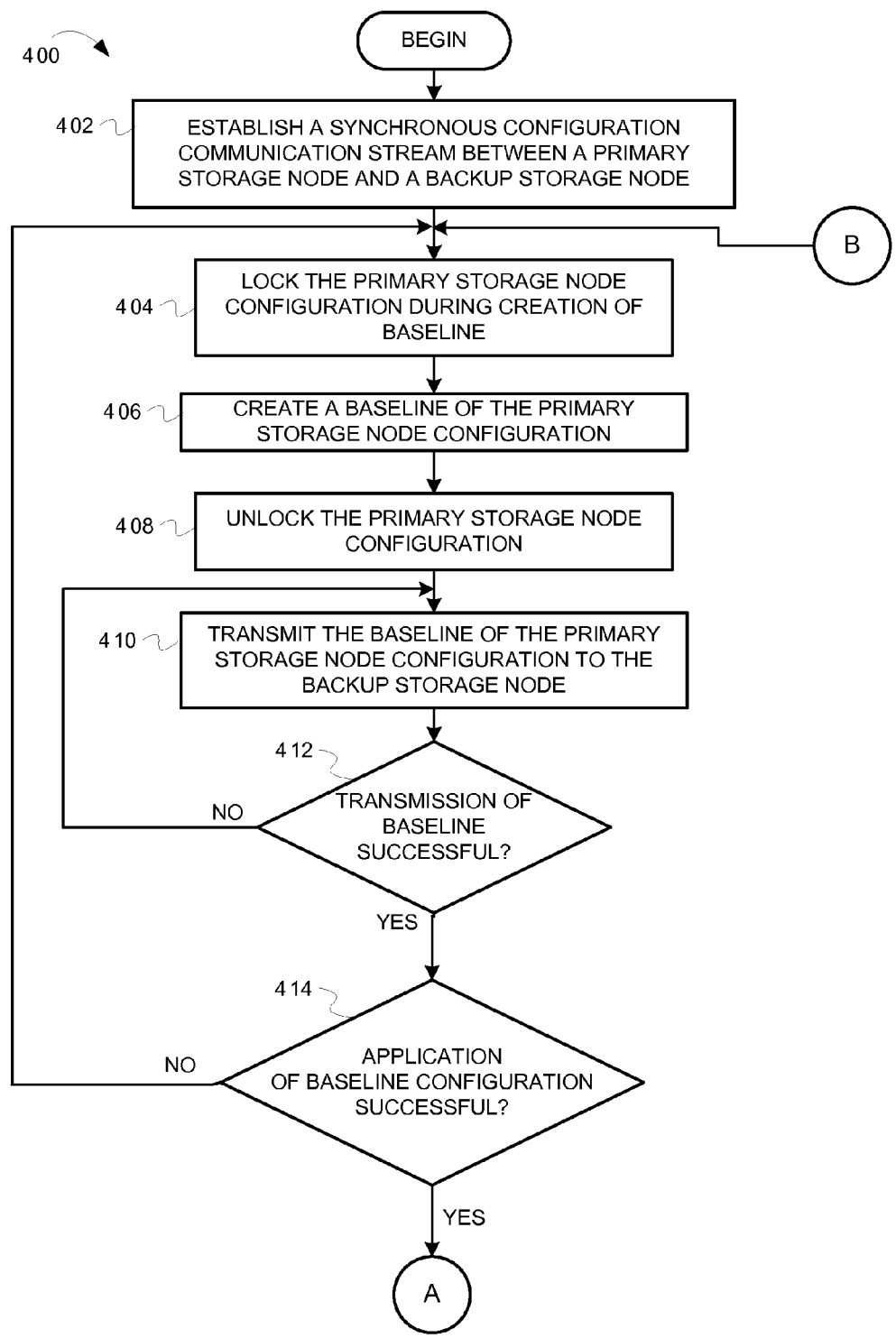
FIGS. 4-5 depict flowcharts of operations by a primary storage node to provide synchronous configuration updates to a backup storage node, according to some features.
Figure 5:
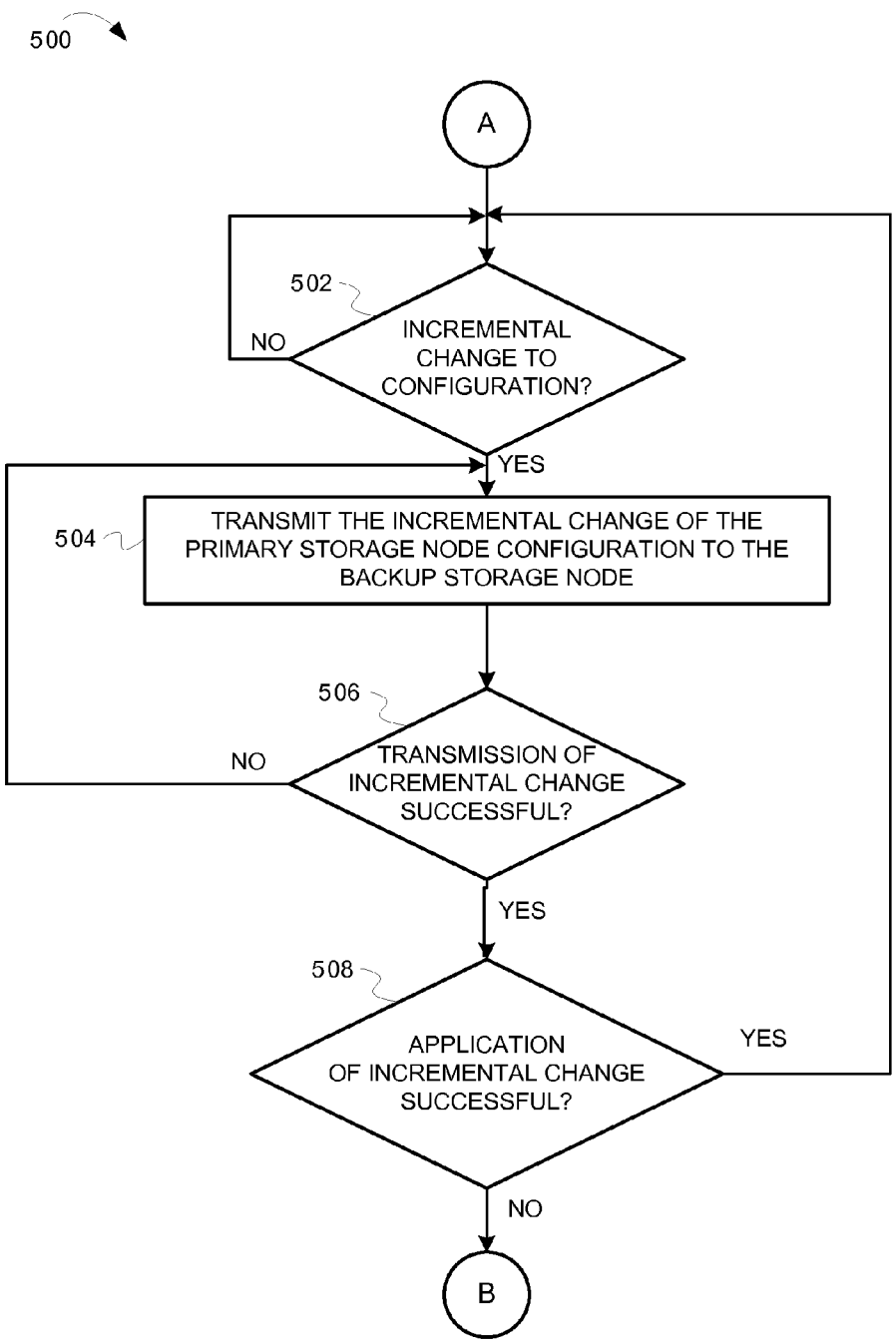

FIGS. 4-5 depict flowcharts of operations by a primary storage node to provide synchronous configuration updates to a backup storage node, according to some features. A flowchart 400 of FIG. 4 and a flowchart 500 of FIG. 5 are described in reference to FIGS. 1-2. The operations of the flowchart 400 and the flowchart 500 are performed together and continue between each other as defined by transition points A and B. The operations of the flowcharts 400-500 can be performed by software, firmware, hardware or a combination thereof. For the flowcharts 400-500, the operations are described as being performed by the Management Module 242 of a node that is considered a primary storage node. The operations of the flowchart 400 start at block 402.

At block 402, a synchronous configuration communication stream is established between the primary storage node and the backup storage node. A synchronous configuration communication stream provides synchronous communications such that a change in configuration at the primary storage node is transmitted after the configuration change occurs at the primary storage node (at or near real time). According to some aspects, the primary storage node and the backup storage node are in two different clusters. With reference to FIG. 1, the node 102 in the cluster 161 can be the primary storage node, and the node 106 in the cluster 160 can be the backup storage node for the primary storage node. Accordingly, if the node 102 becomes non-operational, the node 106 can become active to service data requests from its data store device 132. The data stored in the data store device 132 of the backup storage node can be synced with the data stored in the data store device 130 of the primary storage node. Accordingly to some aspects, the Management Module 242 of the primary storage node establishes the synchronous configuration communication stream with the backup storage node. With reference to the example of FIGS. 1-2, the Management Module 242 in one of the nodes in the cluster 161 can establish the synchronous configuration communication stream with the cluster 160 over the network 190 for the replication of configuration between the nodes in the cluster 161 and the nodes in the cluster 160. According to some aspects, the synchronous configuration communication stream can be separate from any data communication between the primary storage node and the secondary storage node to keep data between the two in sync. Operations of the flowchart 400 continue at block 404.

At block 404, the configuration of the primary storage node is locked during creation of a baseline for the configuration. With reference to FIG. 2, the Management Module 242 can lock the configuration of the primary storage node. For example, the Management Module 242 can preclude any updates to the configuration of the primary storage node while the creation of the baseline for the configuration is being created. The creation of the baseline for the configuration can occur when the primary storage node and/or the backup storage node is being initialized. For example, the creation of the baseline for the configuration can occur after the backup storage node is initialized and has not yet been configured. Or, the creation of the baseline for the configuration can occur after the primary storage node has been initialized such that a new configuration baseline is transmitted to the backup storage node even if the backup storage node is operational. This can ensure that the configurations of the primary storage node and the backup storage node are initially in sync prior to subsequent configuration updates. Operations of the flowchart 400 continue at block 406.

At block 406, a baseline of the configuration of the primary storage node is created. With reference to FIG. 2, the Management Module 242 of the primary cluster can create the baseline of the configuration of the primary storage node. Examples of the type of configuration can include the number of volumes, network and service configuration, protocol configuration for communications (e.g., Network File System (NFS) protocol, Common Internet File System (CIFS) protocol, Storage Area Network (SAN) protocol, etc.), policies (e.g., quota policy, snapshot policy, volume efficiency policy, etc.), security configurations (e.g., types of data encryption for storage and transmission, etc.), quality of service configurations, etc. Operations of the flowchart 400 continue at block 408.

At block 408, the configuration of the primary storage node is unlocked. With reference to FIG. 2, the Management Module 242 of the primary cluster can unlock the configuration. Accordingly, the configuration of the primary storage node can be updated. Operations of the flowchart 400 continue at block 410.

At block 410, the baseline configuration of the primary storage node is transmitted to the backup storage node. With reference to FIGS. 1-2, the Management Module 242 of the node 102 (the primary storage node) can transmit the baseline configuration of the primary storage node to the node 106 (the backup storage node) through the synchronous configuration communication stream over the network 190. Operations of the flowchart 400 continue at block 412.

At block 412, a determination is made of whether transmission of the baseline configuration to the backup storage node was successful. With reference to FIGS. 1-2, the Management Module 242 of the cluster 161 (the primary cluster) can make this determination. For example, the Management Module 242 on the cluster 160 (the backup cluster) can transmit a confirmation that the configuration baseline was received. The Management Module 242 of the cluster 161 (the primary cluster) can then make this determination based on whether the confirmation is received from the Management Module 242 on the cluster 160 (the backup cluster). If transmission was not successful, operations of the flowchart 400 return to block 410 to retransmit the configuration baseline of the primary storage node. Otherwise, operations of the flowchart 400 continue at block 414.

At block 414, a determination is made of whether application of the baseline configuration was successful. With reference to FIGS. 1-2, the Management Module 242 of the cluster 161 (the primary cluster) can make this determination. For example, the Management Module 242 on the cluster 160 (the backup cluster) can transmit a confirmation that the configuration baseline was successfully applied on the node 106 after installation of the configuration baseline on the node 106. The Management Module 242 of the cluster 161 (the primary cluster) can then make this determination based on whether the confirmation of the application of the baseline configuration was received from the Management Module 242 on the cluster 160 (the backup cluster). If application was not successful, operations of the flowchart 400 return to block 404 to lock the primary storage node configuration to create the baseline configuration again. Otherwise, operations of the flowchart 400 continue at transition point A, which continues at transition point A of the flowchart 500 depicted in FIG. 5, which is now described.

At block 502, a determination is made of whether an incremental change to the configuration of the primary storage node has occurred. With reference to FIGS. 1-2, the Management Module 242 of the cluster 161 (the primary cluster) can make this determination. For example, some change to a configuration of the primary storage node (e.g., type of communication, number of volumes, etc.) can occur at the primary storage node during operation of the primary storage node. If there is no incremental change to the configuration of the primary storage node, operations of the flowchart 500 remain at block 502 until an incremental change has occurred. Otherwise, operations of the flowchart 500 continue at block 504.

Figure 6:
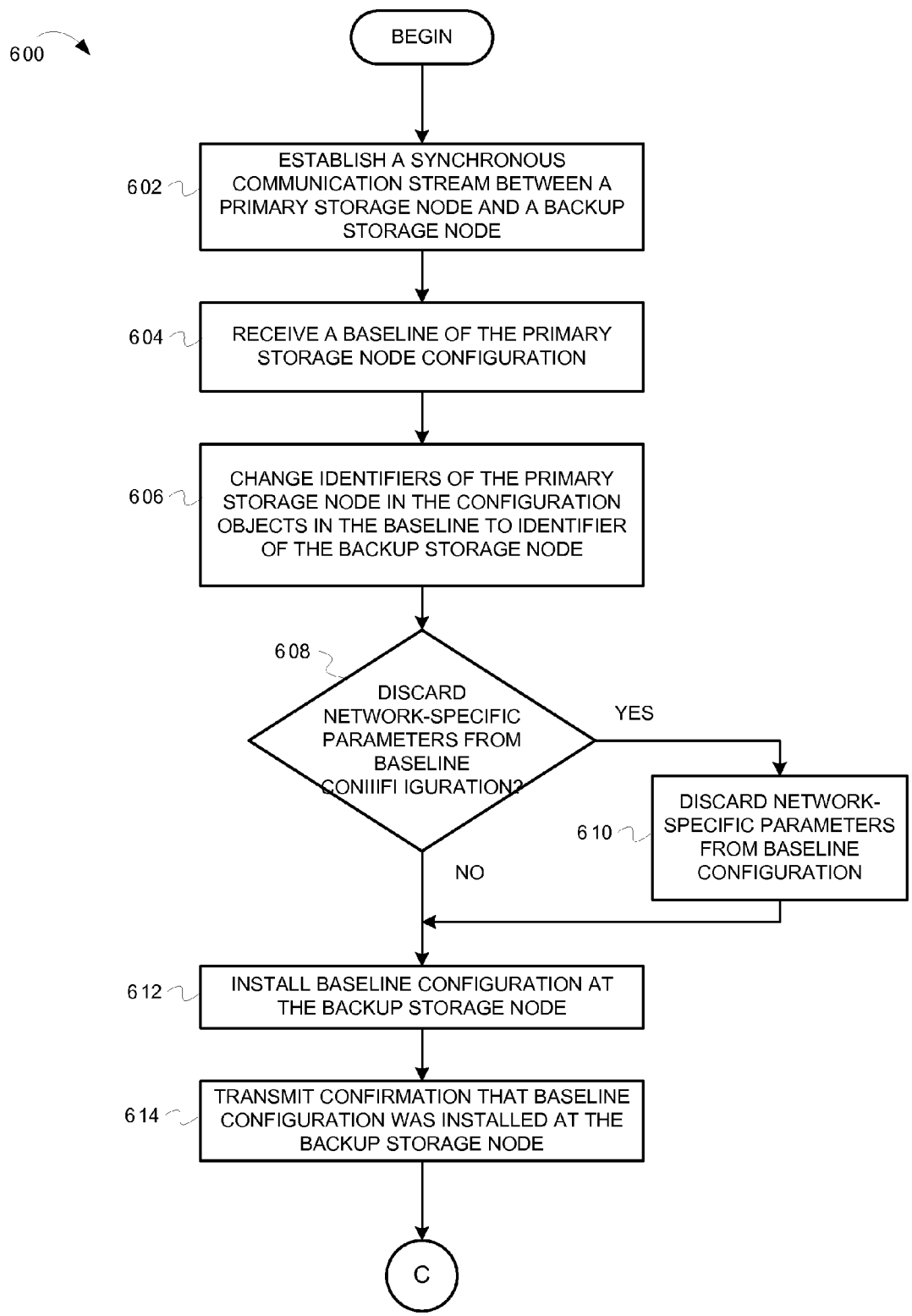
FIGS. 6-7 depict flowcharts of operations by a backup storage node for synchronous configuration updates from a primary storage node, according to some features.
Figure 7:
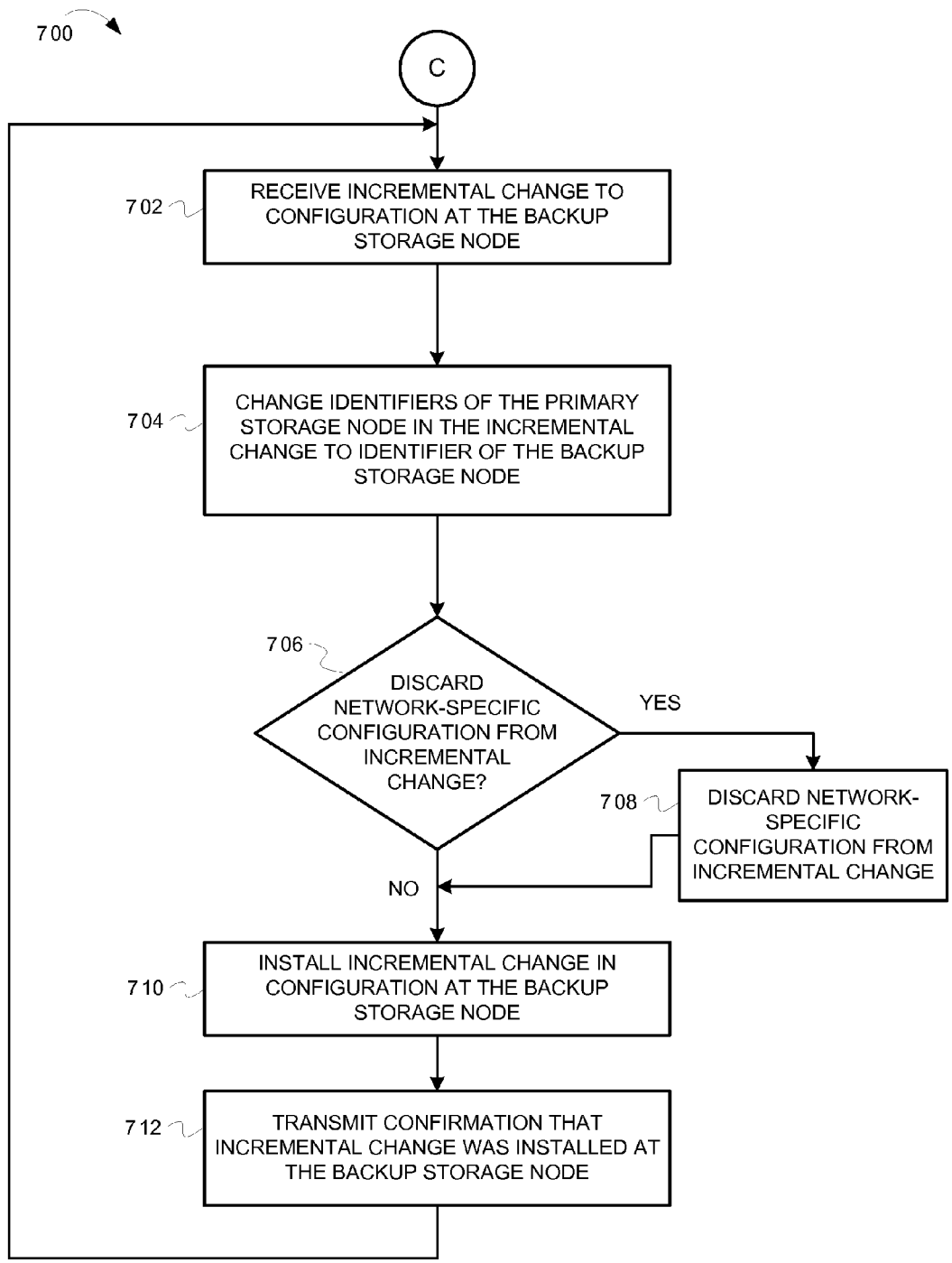

At block 504, the incremental change of the configuration of the primary storage node is transmitted to the backup storage node. With reference to FIGS. 1-2, the Management Module 242 of the cluster 161 (the primary cluster) can transmit the incremental change of the configuration over the network 190 to the node 106 (the backup storage node). The Management Module 242 of the cluster 160 (the backup cluster) can then process the incremental change of the configuration, which is depicted in FIGS. 6-7, which are described in more detail below. Operations of the flowchart 500 continue at block 506.

At block 506, a determination is made of whether transmission of the incremental change of the configuration to the backup storage node was successful. With reference to FIGS. 1-2, the Management Module 242 of the cluster 161 (the primary cluster) can make this determination. For example, the Management Module 242 on the cluster 160 (the backup cluster) can transmit a confirmation that the incremental change was received. The Management Module 242 of the cluster 161 (the primary cluster) can then make this determination based on whether the confirmation is received from the Management Module 242 on the cluster 160 (the backup cluster). If transmission was not successful, operations of the flowchart 500 return to block 504 to retransmit the incremental change. Otherwise, operations of the flowchart 500 continue at block 508.

At block 508, a determination is made of whether application of the incremental change to the configuration was successful. With reference to FIGS. 1-2, the Management Module 242 of the cluster 161 (the primary cluster) can make this determination. For example, the Management Module 242 on the cluster 160 (the backup cluster) can transmit a confirmation that the incremental change to the configuration was successfully applied on the node 106 after installation of the incremental change on the node 106. The Management Module 242 of the cluster 161 (the primary cluster) can then make this determination based on whether the confirmation of the application of the incremental change was received from the Management Module 242 on the cluster 160 (the backup cluster). If application was successful, operations of the flowchart 500 return to block 502 determine whether another incremental change to the configuration has occurred. Otherwise, operations of the flowchart 500 continue at transition point B, which continues at transition point B of the flowchart 400 depicted in FIG. 4.

Operations for processing synchronous configuration updates by the backup storage node are now described. FIGS. 6-7 depict flowcharts of operations by a backup storage node for synchronous configuration updates from a primary storage node, according to some features. The operations of a flowchart 600 of FIG. 6 and a flowchart 700 of FIG. 7 are described in reference to FIGS. 1-2. The operations of a flowchart 600 and the flowchart 700 are performed together and continue between each other as defined by transition point C. The operations of the flowcharts 600-700 can be performed by software, firmware, hardware or a combination thereof. For the flowcharts 600-700, the operations are described as being performed by the Management Module 242 of a node that is considered as part of a backup cluster. The operations of the flowchart 600 start at block 602.

At block 602, a synchronous configuration communication stream is established between the primary storage node and the backup storage node. With reference to FIG. 1-2 as described above, the Management Module 242 of the cluster 160 (the backup cluster) can receive communications from the Management Module 242 of the cluster 161 (the primary cluster) to establish the synchronous configuration communication stream over the network 190. Operations of the flowchart 600 continue at block 604.

At block 604, a configuration baseline of the primary storage node is received. With reference to FIG. 1-2, the Management Module 242 of the cluster 160 (the backup cluster) can receive the configuration baseline from the cluster 161 (the primary cluster) through the synchronous configuration communication stream over the network 190. Operations of the flowchart 600 continue at block 606.

At block 606, identifiers of the primary storage node that are in the configuration baseline are changed to identifiers of the backup storage node. In particular, the identifiers of the primary storage node may be unique within its own cluster but may not be unique external to its cluster. For example, each storage node may have some alphanumeric value that is a unique identifier relative to identifiers of other storage nodes in the same cluster. To illustrate with reference to FIG. 1, the node 102 (the primary storage node) may have an identifier that is unique within the cluster 161. However, that identifier for the node 102 (the primary storage node) may not be unique within the cluster 160 where the node 106 (the backup storage node) is located. Therefore, the Management Module 242 of the cluster 160 (the backup cluster) changes the identifiers of the node 102 (the primary storage node) in the configuration baseline to identifiers of the node 106 (the backup storage node). This change can be for one or more configuration objects that are part of the configuration baseline. Operations of the flowchart 600 continue at block 608.

At block 608, a determination is made of whether to discard network-specific parameters from the baseline configuration. With reference to FIGS. 1-2, the Management Module 242 of the cluster 160 (the backup cluster) can make this determination. The network-specific parameters can include the network address (e.g., Internet Protocol (IP) address) that is assigned to the primary storage node, the protocol settings used for network communications by the primary storage node, etc. For example, the Management Module 242 can determine to discard the network-specific parameters from the baseline configuration if the primary storage node and the backup storage node are in two different networks. If the determination is made to discard network-specific parameters from the baseline configuration, operations of the flowchart 600 continue at block 610. Otherwise, operations of the flowchart 600 continue at block 612.

At block 610, network-specific parameters are discarded from the baseline configuration. With reference to FIGS. 1-2, the Management Module 242 of the cluster 160 (the backup cluster) can discard the network-specific parameters from the baseline configuration. According to some features, the Management Module 242 of the cluster 160 (the backup cluster) can also replace the discarded network-specific parameters with network-specific parameters for the node 106. Alternatively, an operator that controls the cluster 160 can manually configure the baseline configuration to include network-specific parameters of the node 106 (the backup storage node). Operations of the flowchart 600 continue at block 612.

At block 612, the baseline configuration is installed at the backup storage node. With reference to FIGS. 1-2, the Management Module 242 of the cluster 160 (the backup cluster) can install the baseline configuration at the node 106. For example, the Management Module 242 can store the baseline configuration in the local storage 230 at the node 106. Operations of the flowchart 600 continue at block 614.

At block 614, confirmation that the baseline configuration was installed at the backup storage node is transmitted back to the primary storage node. With reference to FIGS. 1-2, the Management Module 242 of the cluster 160 (the backup cluster) can transmit the confirmation to the node 102 (the primary storage node) over the network 190. Operations of the flowchart 600 continue at transition point C, which continues at transition point C of the flowchart 700 depicted in FIG. 7, which is now described.

At block 702, an incremental change to the configuration that occurred at the primary storage node is received at the backup storage node. With reference to FIG. 1-2, the Management Module 242 of the cluster 160 (the backup cluster) can receive the incremental change from the node 102 (the primary storage node) through the synchronous configuration communication stream over the network 190. Operations of the flowchart 700 continue at block 704.

At block 704, identifiers of the primary storage node that are in the incremental change to the configuration are changed to identifiers of the backup storage node. With reference to FIGS. 1-2, the Management Module 242 of the cluster 160 (the backup cluster) changes the identifiers of the node 102 (the primary storage node) in the incremental change to identifiers of the node 106 (the backup storage node). Operations of the flowchart 700 continue at block 706.

At block 706, a determination is made of whether to discard network-specific parameters from the incremental change. With reference to FIGS. 1-2, the Management Module 242 of the cluster 160 (the backup cluster) can make this determination. The network-specific parameters can include the network address (e.g., Internet Protocol (IP) address) that is assigned to the primary storage node, the protocol settings used for network communications by the primary storage node, etc. For example, the Management Module 242 can determine to discard the network-specific parameters from the incremental change to the baseline configuration if the primary storage node and the backup storage node are in two different networks. If the determination is made to discard network-specific parameters from the incremental change, operations of the flowchart 700 continue at block 708. Otherwise, operations of the flowchart 700 continue at block 710.

At block 708, network-specific parameters are discarded from the incremental change to the baseline configuration. With reference to FIGS. 1-2, the Management Module 242 of the cluster 160 (the backup cluster) can discard the network-specific parameters from the incremental change. According to some features, the Management Module 242 of the cluster 160 (the backup cluster) can also replace the discarded network-specific parameters with network-specific parameters for the node 106. Alternatively, an operator that controls the cluster 160 can manually update the incremental change to include network-specific parameters of the node 106 (the backup storage node). Operations of the flowchart 700 continue at block 710.

At block 710, the incremental change to the baseline configuration is installed at the backup storage node. With reference to FIGS. 1-2, the Management Module 242 of the cluster 160 (the backup cluster) can install the incremental change at the node 106. For example, the Management Module 242 can update (e.g., replace) a portion of the baseline configuration that is currently stored in the local storage 230 at the node 106. As part of applying the configuration, the replicated database (RDB) gets updated. If application of the incremental change is successful, the baseline configuration packet can be deleted. Therefore, upon applying the incremental change, some part of the RDB only gets updated. Operations of the flowchart 700 continue at block 712.

At block 712, confirmation that the incremental change to the baseline configuration was installed at the backup storage node is transmitted back to the primary storage node. With reference to FIGS. 1-2, the Management Module 242 of the cluster 160 (the backup cluster) can transmit the confirmation to the cluster 161 (the primary cluster) over the network 190. Operations of the flowchart 700 continue at block 702 to process the receiving of another incremental change to the configuration at the backup cluster. Thus, the operations of the flowcharts 600-700 can continue as long as the backup cluster remains operational.

Example Asynchronous Configuration Update Operations

Figure 8:
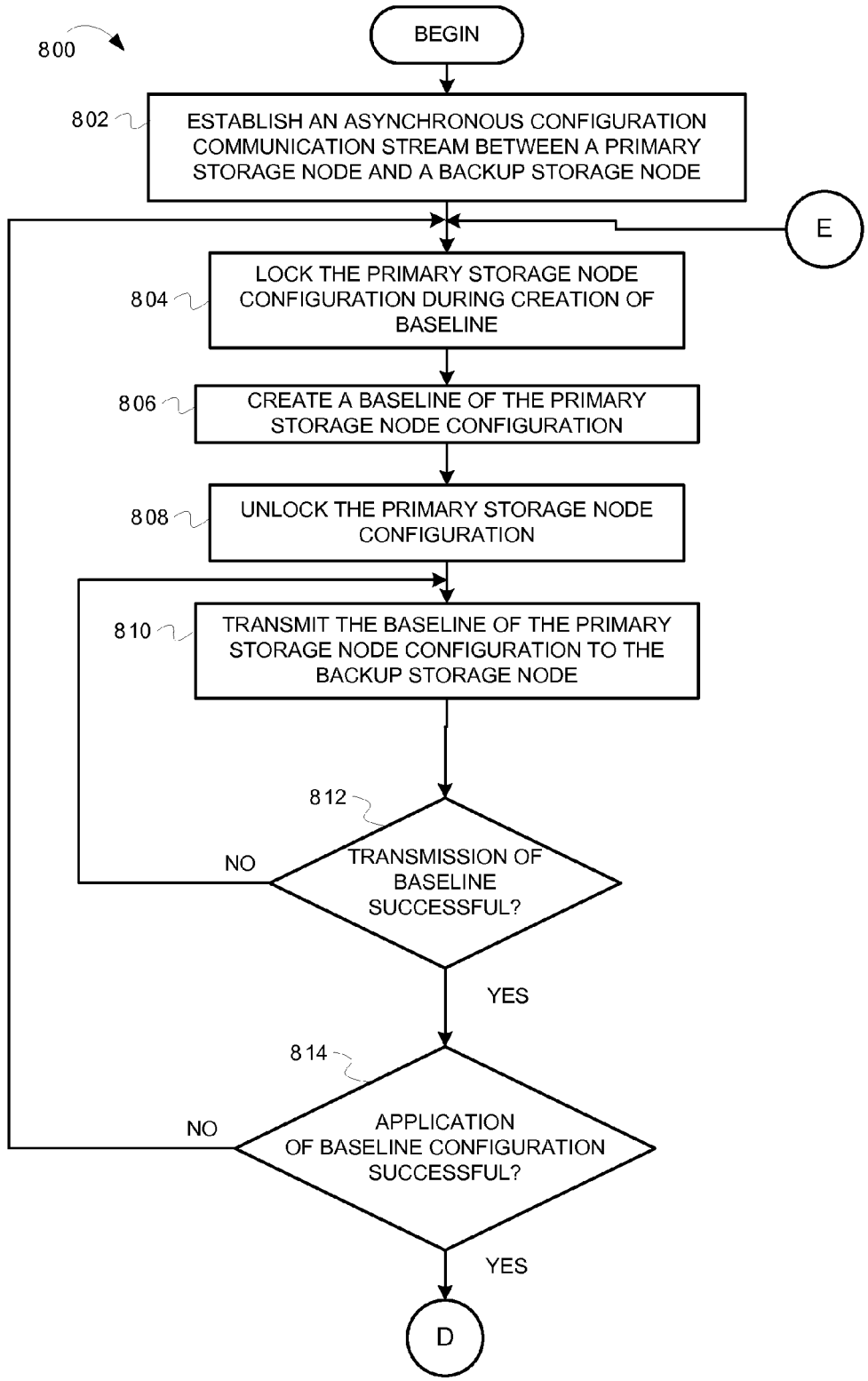
FIG. 8-9 depict flowcharts of operations by a primary storage node to provide asynchronous configuration updates to a backup storage node, according to some features.
Figure 9:
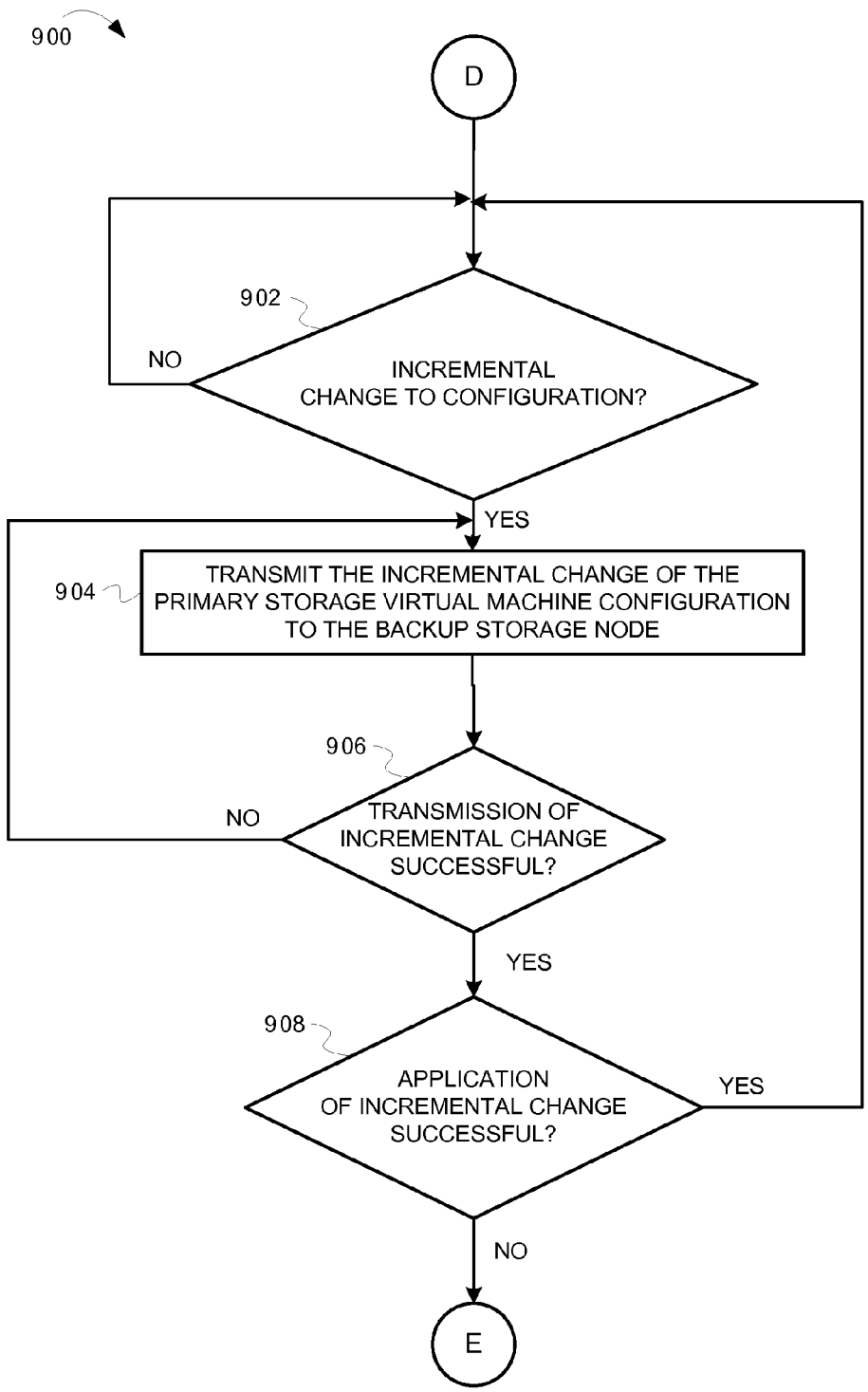

Operations for asynchronous updating of configuration are now described, such that changes in configuration at the primary storage node are periodically applied to the backup storage node. For asynchronous updating, the transmitted configuration updates can accumulate at the backup storage node. Application of these configuration updates may be delayed until a next schedule update. FIGS. 8-9 depict flowcharts of operations by a primary storage node to provide asynchronous configuration updates to a backup storage node, according to some features. A flowchart 800 of FIG. 8 and a flowchart 900 of FIG. 9 are described in reference to FIGS. 1-2. The operations of the flowcharts 800-900 are performed together and continue among each other as defined by transition points D and E. The operations of the flowcharts 800-900 can be performed by software, firmware, hardware or a combination thereof. For the flowcharts 800-900, the operations are described as being performed by the Management Module 242 of a node that is considered a primary storage node. The operations of the flowchart 800 start at block 802.

At block 802, an asynchronous configuration communication stream is established between the primary storage node and the backup storage node. An asynchronous configuration communication stream provides asynchronous communications such that change(s) in configuration at the primary storage node is applied periodically. Therefore, there can be a delay between when the configuration change occurs at the primary storage node and when the change is applied to the backup storage node. Also, more than one configuration change can be applied to the backup storage node at the periodic point in time (depending on how many configuration changes have occurred since the prior periodic point in time. Accordingly to some aspects, the Management Module 242 of the primary cluster establishes the asynchronous configuration communication stream with the backup storage node. With reference to the example of FIGS. 1-2, the Management Module 242 in the cluster 161 can establish the asynchronous configuration communication stream with the cluster 160 over the network 190. According to some aspects, the asynchronous configuration communication stream can be separate from any data communication between the primary storage node and the secondary storage node to keep data between the two in sync. Operations of the flowchart 800 continue at block 804.

At block 804, the configuration of the primary storage node is locked during creation of a baseline for the configuration. With reference to FIG. 2, the Management Module 242 can lock the configuration of the primary storage node. For example, the Management Module 242 can preclude any updates to the configuration of the primary storage node while the baseline for the configuration is being created. The creation of the baseline for the configuration can occur when the primary storage node and/or the backup storage node is being initialized. For example, the creation of the baseline for the configuration can occur after the backup storage node is initialized and has not yet been configured. Or, the creation of the baseline for the configuration can occur after the primary storage node has been initialized such that a new configuration baseline is transmitted to the backup storage node even if the backup storage node is operational. This can ensure that the configurations of the primary storage node and the backup storage node are initially in sync prior to subsequent configuration updates. Operations of the flowchart 800 continue at block 806.

At block 806, a baseline of the configuration of the primary storage node is created. With reference to FIG. 2, the Management Module 242 of the primary cluster can create the baseline of the configuration of the primary storage node. Examples of the type of configuration can include the number of volumes, network and service configuration, protocol configuration for communications (e.g., Network File System (NFS) protocol, Common Internet File System (CIFS) protocol, Storage Area Network (SAN) protocol, etc.), policies (e.g., quota policy, snapshot policy, volume efficiency policy, etc.), security configurations (e.g., types of data encryption for storage and transmission, etc.), quality of service configurations, etc. Operations of the flowchart 800 continue at block 808.

At block 808, the configuration of the primary storage node is unlocked. With reference to FIG. 2, the Management Module 242 of the primary storage node can unlock the configuration. Accordingly, the configuration of the primary storage node can be updated. Operations of the flowchart 800 continue at block 810.

At block 810, the baseline configuration of the primary storage node is transmitted to the backup storage node. With reference to FIGS. 1-2, the Management Module 242 of the cluster 161 (the primary cluster) can transmit the baseline configuration of the primary storage node to the cluster 160 (the backup cluster) through the synchronous configuration communication stream over the network 190. Operations of the flowchart 800 continue at block 812.

At block 812, a determination is made of whether transmission of the baseline configuration to the backup storage node was successful. With reference to FIGS. 1-2, the Management Module 242 of the cluster 161 (the primary cluster) can make this determination. For example, the Management Module 242 on the cluster 160 (the backup cluster) can transmit a confirmation that the configuration baseline was received. The Management Module 242 of the cluster 161 (the primary cluster) can then make this determination based on whether the confirmation is received from the Management Module 242 on the cluster 160 (the backup cluster). If transmission was not successful, operations of the flowchart 800 return to block 810 to retransmit the configuration baseline of the primary storage node. Otherwise, operations of the flowchart 800 continue at block 814.

At block 814, a determination is made of whether application of the baseline configuration was successful. With reference to FIGS. 1-2, the Management Module 242 of the cluster 161 (the primary cluster) can make this determination. For example, the Management Module 242 on the cluster 160 (the backup cluster) can transmit a confirmation that the configuration baseline was successfully applied on the node 106 after installation of the configuration baseline on the node 106. The Management Module 242 of the cluster 161 (the primary cluster) can then make this determination based on whether the confirmation of the application of the baseline configuration was received from the Management Module 242 on the cluster 160 (the backup cluster). If application was not successful, operations of the flowchart 800 return to block 804 to lock the primary storage node configuration to create the baseline configuration again. Otherwise, operations of the flowchart 800 continue at transition point D, which continues at transition point D of the flowchart 900 depicted in FIG. 9, which is now described.

At block 902, a determination is made of whether an incremental change to the configuration of the primary storage node has occurred. With reference to FIGS. 1-2, the Management Module 242 of the cluster 161 (the primary cluster) can make this determination. For example, some change to a configuration of the primary storage node (e.g., type of communication, number of volumes, etc.) can occur at the primary storage node during operation of the primary storage node. If there is no incremental change to the configuration of the primary storage node, operations of the flowchart 900 remain at block 902 until an incremental change has occurred. Otherwise, operations of the flowchart 900 continue at block 904.

Figure 10:
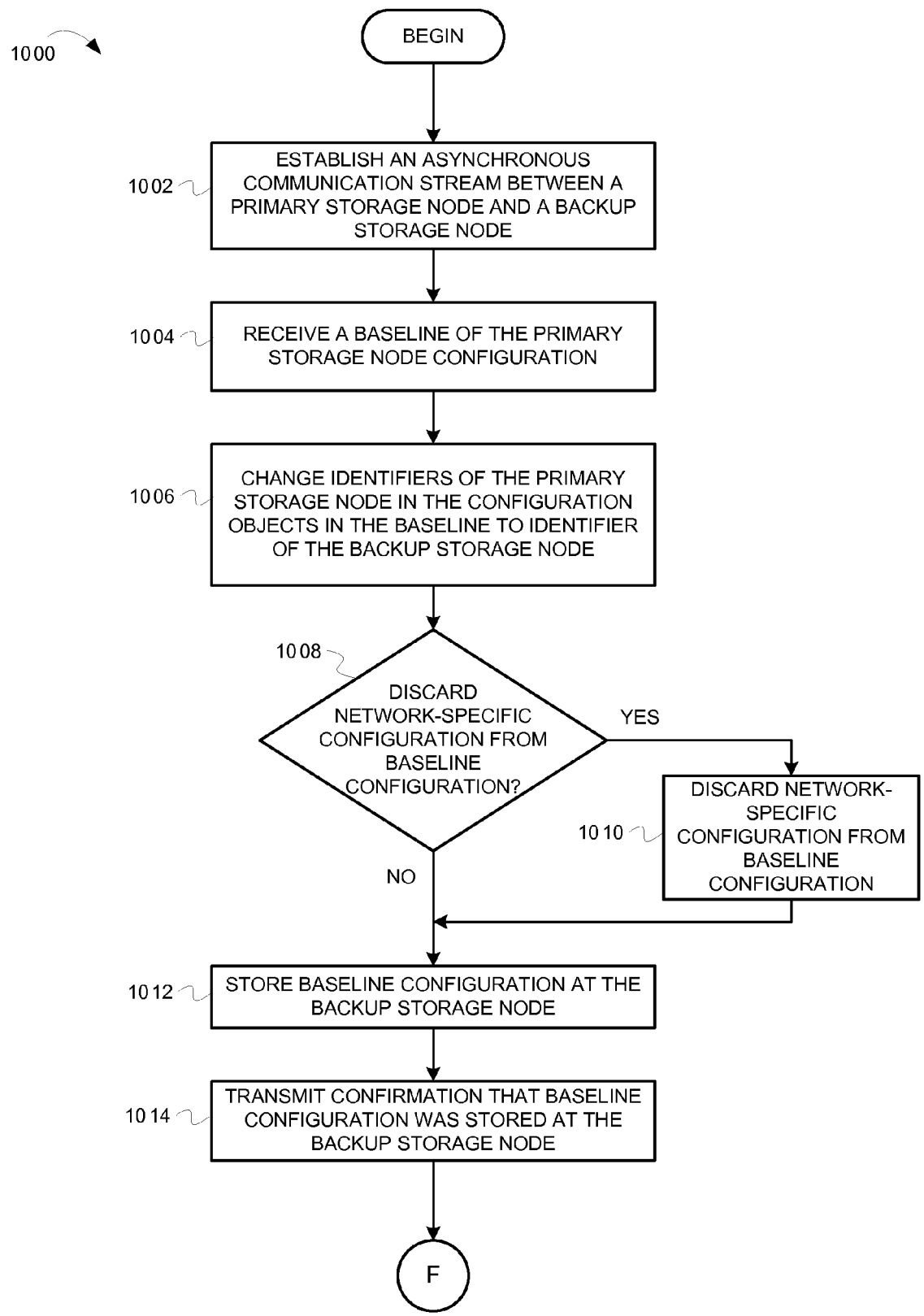
FIGS. 10-12 depict flowcharts of operations by a backup storage node for asynchronous configuration updates from a primary storage node, according to some features.
Figure 11:
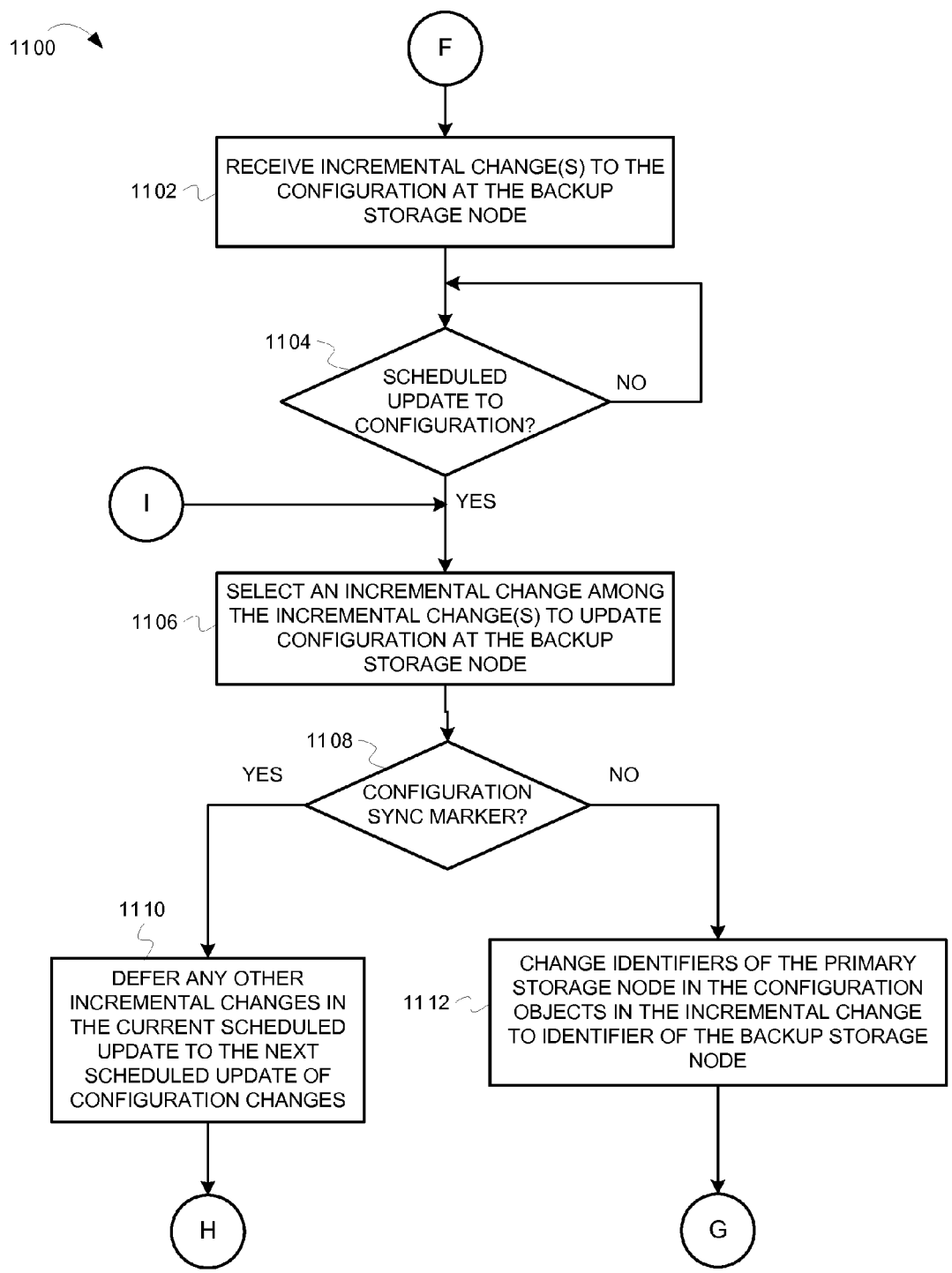
Figure 12:
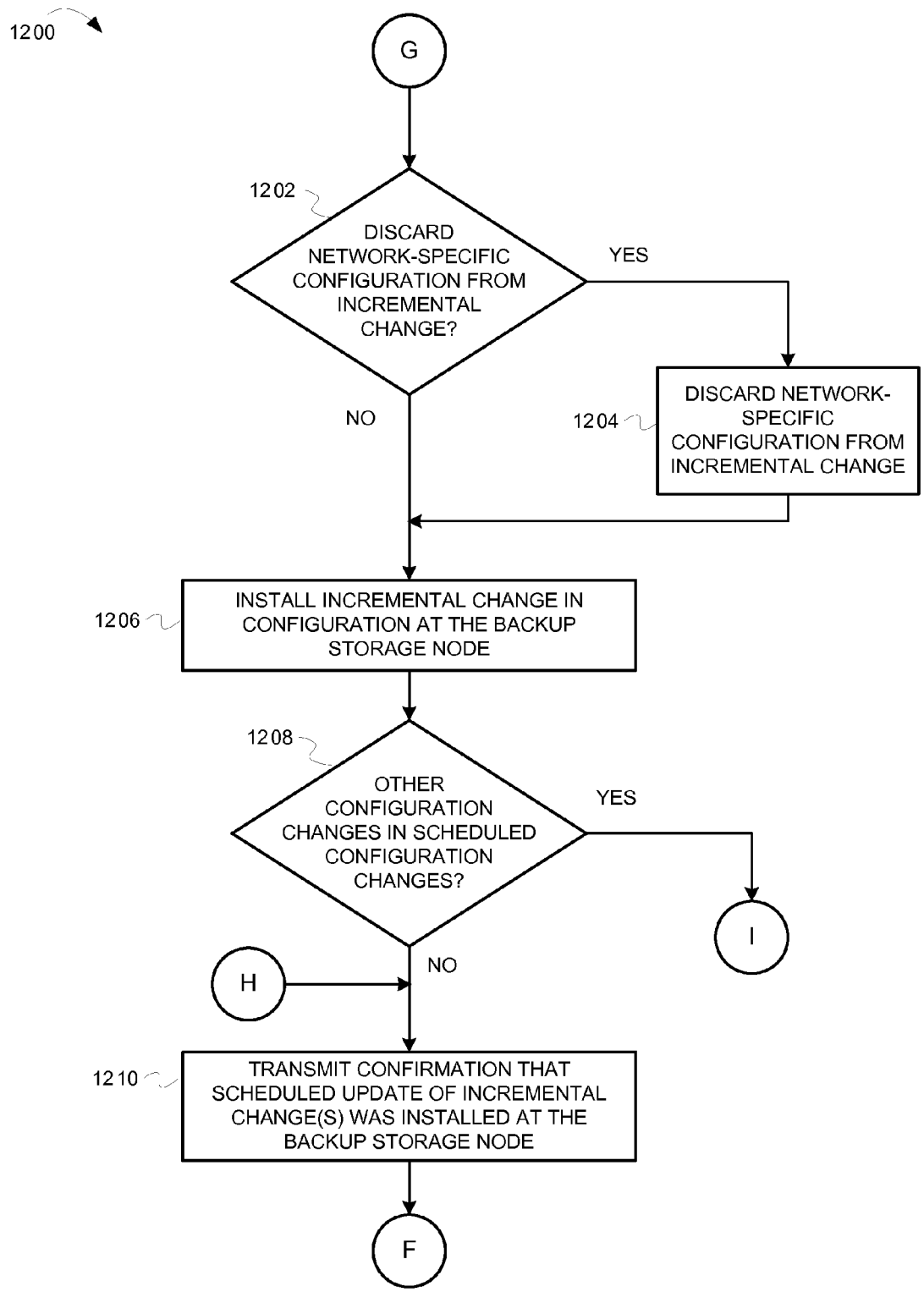

At block 904, the incremental change of the configuration of the primary storage node is transmitted to the backup storage node. With reference to FIGS. 1-2, the Management Module 242 of the cluster 161 (the primary cluster) can transmit the incremental change of the configuration over the network 190 to the node 106 (the backup storage node). The Management Module 242 of the cluster 160 (the backup cluster) can then process the incremental change of the configuration, which is depicted in FIGS. 10-12, which are described in more detail below. Operations of the flowchart 800 continue at block 906.

At block 906, a determination is made of whether transmission of the incremental change of the configuration to the backup storage node was successful. With reference to FIGS. 1-2, the Management Module 242 of the cluster 161 (the primary cluster) can make this determination. For example, the Management Module 242 on the cluster 160 (the backup cluster) can transmit a confirmation that the incremental change was received. The Management Module 242 of the cluster 161 (the primary cluster) can then make this determination based on whether the confirmation is received from the Management Module 242 on the cluster 160 (the backup cluster). If transmission was not successful, operations of the flowchart 900 return to block 904 to retransmit the incremental change. Otherwise, operations of the flowchart 900 continue at block 908.

At block 908, a determination is made of whether application of the incremental change to the configuration was successful. With reference to FIGS. 1-2, the Management Module 242 of the cluster 161 (the primary cluster) can make this determination. For example, the Management Module 242 on the cluster 160 (the backup cluster) can transmit a confirmation that the incremental change to the configuration was successfully applied on the node 106 after installation of the incremental change on the node 106. The Management Module 242 of the cluster 161 (the primary cluster) can then make this determination based on whether the confirmation of the application of the incremental change was received from the Management Module 242 on the cluster 160 (the backup cluster). If application was successful, operations of the flowchart 900 return to block 902 determine whether another incremental change to the configuration has occurred. Otherwise, operations of the flowchart 900 continue at transition point E, which continues at transition point E of the flowchart 800 depicted in FIG. 8.

Operations for processing asynchronous configuration updates by the backup storage node are now described. FIGS. 10-12 depict flowcharts of operations by a backup storage node for asynchronous configuration updates from a primary storage node, according to some features. The operations of a flowchart 1000 of FIG. 10, a flowchart 1100 of FIG. 11, and a flowchart 1200 of FIG. 12 are described in reference to FIGS. 1-2. The operations of the flowcharts 1000-1200 are performed together and continue among each other as defined by transition points F, G, H, and I. The operations of the flowcharts 1000-1200 can be performed by software, firmware, hardware or a combination thereof. For the flowcharts 1000-1200, the operations are described as being performed by the Management Module 242 of a node that considered a backup storage node. The operations of the flowchart 1000 start at block 1002.

At block 1002, an asynchronous configuration communication stream is established between the primary storage node and the backup storage node. With reference to FIG. 1-2 as described above, the Management Module 242 of the cluster 160 (the backup cluster) can receive communications from the Management Module 242 of the cluster 161 (the primary cluster) to establish the asynchronous configuration communication stream over the network 190. Operations of the flowchart 1000 continue at block 1004.

At block 1004, a configuration baseline of the primary storage node is received. With reference to FIG. 1-2, the Management Module 242 of the cluster 160 (the backup cluster) can receive the configuration baseline from the cluster 161 (the primary cluster) through the asynchronous configuration communication stream over the network 190. Operations of the flowchart 1000 continue at block 1006.

At block 1006, identifiers of the primary storage node that are in the configuration baseline are changed to identifiers of the backup storage node. In particular (as described above), the identifiers of the primary storage node may be unique within its own cluster but may not be unique external to its cluster. Therefore, the Management Module 242 of the cluster 160 (the backup cluster) changes the identifiers of the node 102 (the primary storage node) in the configuration baseline to identifiers of the node 106 (the backup storage node). This change can be for one or more configuration objects that are part of the configuration baseline. Operations of the flowchart 1000 continue at block 1008.

At block 1008, a determination is made of whether to discard network-specific parameters from the baseline configuration. With reference to FIGS. 1-2, the Management Module 242 of the cluster 160 (the backup cluster) can make this determination. The network-specific parameters can include the network address (e.g., Internet Protocol (IP) address) that is assigned to the primary storage node, the protocol settings used for network communications by the primary storage node, etc. For example, the Management Module 242 can determine to discard the network-specific parameters from the baseline configuration if the primary storage node and the backup storage node are in two different networks. If the determination is made to discard network-specific parameters from the baseline configuration, operations of the flowchart 1000 continue at block 1010. Otherwise, operations of the flowchart 1000 continue at block 1012.

At block 1010, network-specific parameters are discarded from the baseline configuration. With reference to FIGS. 1-2, the Management Module 242 of the cluster 160 (the backup cluster) can discard the network-specific parameters from the baseline configuration. According to some features, the Management Module 242 of the cluster 160 (the backup cluster) can also replace the discarded network-specific parameters with network-specific parameters for the node 106. Alternatively, an operator that controls the cluster 160 can manually configure the baseline configuration to include network-specific parameters of the node 106 (the backup storage node). Operations of the flowchart 1000 continue at block 1012.

At block 1012, the baseline configuration is installed at the backup storage node. With reference to FIGS. 1-2, the Management Module 242 of the cluster 160 (the backup cluster) can install the baseline configuration at the node 106. For example, the Management Module 242 can update the configuration database according to the baseline configuration. Operations of the flowchart 1000 continue at block 1014.

At block 1014, confirmation that the baseline configuration was installed at the backup storage node is transmitted back to the primary storage node. With reference to FIGS. 1-2, the Management Module 242 of the cluster 160 (the backup cluster) can transmit the confirmation to the node 102 (the primary storage node) over the network 190. Operations of the flowchart 1000 continue at transition point F, which continues at transition point F of the flowchart 1100 depicted in FIG. 11, which is now described.

At block 1102, the incremental change(s) to the configuration at the backup storage node are received from the primary storage node. With reference to FIGS. 1-2, the Management Module 242 of the cluster 160 (the backup cluster) can receive the incremental change(s) to the configuration as the change(s) occur at the primary storage node occur. Operations of the flowchart 100 continue at block 1104.

At block 1104, a determination is made of whether a scheduled update to the configuration is to be applied by the backup cluster. With reference to FIGS. 1-2, the Management Module 242 of the cluster 160 (the backup cluster) can make this determination based on whether incremental change(s) to the configuration are received from the cluster 161 (the primary cluster). If no scheduled update to the configuration is received, operations of the flowchart 1100 remain at block 1104. Otherwise, operations of the flowchart 1100 continue at block 1106.

At block 1106, an incremental change among the incremental change(s) is selected to update the configuration at the backup storage node. For example, the incremental change(s) can be selected and processed in the same order that they occurred at the primary storage node. Thus, the oldest incremental change can be selected first, the second oldest incremental change can be selected second, etc. According to some aspects, unprocessed incremental changes from a previously scheduled update to the configuration are selected for processing prior to the oldest incremental change in the current scheduled update. These unprocessed incremental changes from a previously scheduled update to the configuration are described in more detail below in reference to blocks 808-810. With reference to FIG. 1-2, the Management Module 242 of the cluster 160 (the backup cluster 160) can make the selection of the incremental change. Operations of the flowchart 1100 continue at block 1108.

At block 1108, a determination of whether the selected incremental change is a configuration sync marker is made. The primary storage node can create a configuration sync marker that is to be an incremental change that is to be processed by the backup storage node in response to certain types of incremental changes to the configuration. Therefore, the configuration sync marker can be inserted by the primary storage node into the group of incremental changes to be processed by the backup storage node. The certain types of incremental changes that can trigger the insertion of a configuration sync marker includes an incremental change that is dependent on data replication to be up-to-date at the backup storage node—a data dependent incremental change. For example, assume that the incremental change includes defining parameters (e.g., policies) for a newly created qtree used for data storage. This newly created qtree must be created at the backup storage node prior to defining parameters for this newly created qtree. With reference to FIG. 1-2, the Management Module 242 of the cluster 160 (the backup cluster) can make this determination. If the selected incremental change is a configuration sync marker, operations of the flowchart 1100 continue at block 1110. Otherwise, operations of the flowchart 1100 continue at block 1112.

At block 1110, any other incremental changes in the current scheduled update to the configuration are deferred until the next scheduled update of configuration changes. In other words, the current scheduled update of configuration changes is marked complete. Deferring processing of any other incremental changes in the current scheduled update to the next scheduled update ensures that the data replication on which these other incremental changes may be dependent has occurred. With reference to the example above, the newly created qtree has been created at the backup storage node prior to defining parameters for this newly created qtree. Therefore, some incremental changes that are processed after the data-dependent configuration change may not be dependent on the data replication but can still be deferred until the next scheduled configuration update. With reference to FIG. 1-2, the Management Module 242 of the cluster 160 (the backup cluster) can defer any other incremental changes in the current scheduled update to the configuration. Operations of the flowchart 1100 continue at transition point H, which continues at transition point H of the flowchart 1200 of FIG. 12.

At block 1112, identifiers of the primary storage node that are in the incremental change to the configuration are changed to identifiers of the backup storage node. With reference to FIGS. 1-2, the Management Module 242 of the cluster 160 (the backup cluster) changes the identifiers of the node 102 (the primary storage node) in the incremental change to identifiers of the node 106 (the backup storage node). Operations of the flowchart 1100 continue at transition point G, which continues at transition point G of the flowchart 1200.

At block 1202, a determination is made of whether to discard network-specific parameters from the incremental change. With reference to FIGS. 1-2, the Management Module 242 of the cluster 160 (the backup cluster) can make this determination. The network-specific parameters can include the network address (e.g., Internet Protocol (IP) address) that is assigned to the primary storage node, the protocol settings used for network communications by the primary storage node, etc. For example, the Management Module 242 can determine to discard the network-specific parameters from the incremental change to the baseline configuration if the primary storage node and the backup storage node are in two different networks. If the determination is made to discard network-specific parameters from the incremental change, operations of the flowchart 1200 continue at block 1204. Otherwise, operations of the flowchart 1200 continue at block 1206.

At block 1204, network-specific parameters are discarded from the incremental change to the baseline configuration. With reference to FIGS. 1-2, the Management Module 242 of the cluster 160 (the backup cluster) can discard the network-specific parameters from the incremental change. According to some features, the Management Module 242 of the cluster 160 (the backup cluster) can also replace the discarded network-specific parameters with network-specific parameters for the node 106. Alternatively, an operator that controls the cluster 160 can manually update the incremental change to include network-specific parameters of the node 106 (the backup storage node). Operations of the flowchart 1200 continue at block 1206.

At block 1206, the incremental change to the baseline configuration is installed at the backup storage node. With reference to FIGS. 1-2, the Management Module 242 of the cluster 160 (the backup cluster) can install the incremental change at the node 106. For example, the Management Module 242 can update (e.g., replace) a portion of the baseline configuration that is currently stored in the local configuration database at the node 106. Operations of the flowchart 1200 continue at block 1208.

At block 1208, a determination is made of whether there are any other configuration changes to be processed in this scheduled update of configuration changes. With reference to FIGS. 1-2, the Management Module 242 of the cluster 160 (the backup cluster) can make this determination. If there are any other configuration changes to be processed, operations continue at transition point E, which continues at transition point I in the flowchart 1100 of FIG. 11, where another incremental change is selected at block 1206.

At block 1210, confirmation that the scheduled update of the incremental change(s) to the baseline configuration was installed at the backup storage node is transmitted back to the primary storage node. With reference to FIGS. 1-2, the Management Module 242 of the cluster 160 (the backup cluster) can transmit the confirmation to the node 102 (the primary storage node) over the network 190. According to some aspects, the Management Module 242 can also transmit notification of which incremental changes were deferred until the next scheduled update. Operations of the flowchart 1200 continue at transition point F, which continues at transition point F of the flowchart 1100 of FIG. 11, where a determination is made of whether a next scheduled update to the configuration has occurred. Operations of the flowcharts 1100-1200 can continue to process the receiving of scheduled updates to the configuration as long as the backup storage node remains operational.

As will be appreciated by one skilled in the art, some aspects may be in a system, method or computer program product. Accordingly, some aspects may take the form of entirely hardware, entirely software (including firmware, resident software, micro-code, etc.) or a combination of software and hardware aspects that may all generally be referred to herein as a "circuit," "module" or "system." Furthermore, some aspects may take the form of a computer program product included in one or more computer readable medium(s) having computer readable program code included thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code included therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code included on a computer readable medium may be transmitted using any appropriate medium, including but not limited to wireless, wireline, optical fiber cable, RF, etc., or any suitable combination of the foregoing.

Computer program code for carrying out operations of various aspects may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the various aspects. In general, structures and functionality presented as separate components in the exemplary configurations may be implemented as a combined structure or component. Similarly, structures and functionality presented as a single component may be implemented as separate components. These and other variations, modifications, additions, and improvements.

What is claimed is:

1. A method comprising:
    identifying a change in a primary configuration of a first node while the first node is operational, wherein primary data stored in the first node is to be backed up as backup data in a second node;
    selecting a second node identifier of the second node as a substitute identifier for replacing a node identifier identifying the first node within the change in the primary configuration based upon a determination that the change in the primary configuration is to be used to update a backup configuration of the second node;
    creating an updated configuration change comprising a modified version of the change having the node identifier replaced with the substitute identifier; and
    updating the backup configuration of the second node based on the updated configuration change comprising the substitute identifier of the second node.

2. The method of claim 1, wherein identifying the change in the primary configuration comprises receiving the change as part of a current periodically scheduled update for a number of changes to the backup configuration based on the primary configuration.

3. The method of claim 2, wherein the updated configuration change comprises a data-dependent change that is dependent on an update to the backup data occurring prior to updating the backup configuration of the second node using the updated configuration change.

4. The method of claim 3, further comprising deferring updating the backup configuration using the updated configuration change and a number of changes not incorporated into updating the backup configuration until a next periodically scheduled update to the backup configuration.

5. The method of claim 1, wherein the updated configuration change comprises a volume configuration.

6. The method of claim 1, further comprising establishing a configuration logical connection between the first node and the second node for receiving the change in the primary configuration.

7. The method of claim 6, further comprising:
receiving an update to the backup data based on a change to the primary data; and
updating the backup data based on the update to the backup data.

8. The method of claim 7, wherein the update to the backup data is received through a data logical connection that is different than the configuration logical connection.

9. The method of claim 1, further comprising:
determining that the first node is on a first network and the second node is on a second network that is different from the first network;
determining that the change in the primary configuration comprises an identification of the first network; and
removing the identification of the first network.

10. A non-transitory machine readable medium having stored thereon instructions comprising machine executable code which when executed by at least one machine, causes the at least one machine to:
identifying a change in a primary configuration of a first node while the first node is operational, wherein primary data stored in the first node is to be backed up as backup data in a second node;
select a second node identifier of the second node as a substitute identifier for replacing a node identifier identifying the first node within the change in the primary configuration based upon a determination that the change in the primary configuration is to be used to update a backup configuration of the second node;
create an updated configuration change comprising a modified version of the change having the node identifier replaced with the substitute identifier; and
update the backup configuration of the second node based on the updated configuration change comprising the substitute identifier of the second node.

11. The non-transitory machine readable medium of claim 10, wherein the machine executable code which when executed by the at least one machine causes the at least one machine to defer the update of the backup configuration using the updated configuration change and a number of changes not incorporated into updating the backup configuration until a next periodically scheduled update to the backup configuration.

12. The non-transitory machine readable medium of claim 10, wherein the updated configuration change comprises a volume configuration.

13. The non-transitory machine readable medium of claim 10, wherein the machine executable code which when executed by the at least one machine causes the at least one machine to establish a configuration logical connection between the first node and the second node for receiving the change in the primary configuration.

14. The non-transitory machine readable medium of claim 13, wherein the machine executable code which when executed by the at least one machine causes the at least one machine to:
receive an update to the backup data based on a change to the primary data; and
update the backup data based on the update to the backup data.

15. The non-transitory machine readable medium of claim 14, wherein the machine executable code which when executed by the at least one machine causes the at least one machine to receive the update to the backup data is through a data logical connection that is different than the configuration logical connection.

16. The non-transitory machine readable medium of claim 10, wherein the machine executable code which when executed by the at least one machine causes the at least one machine to:
determine that first node is on a first network and the second node is on a second network that is different from the first network;
determine that the change in the primary configuration comprises an identification of the first network; and
remove the identification of the first network.

17. A computing device comprising:
a memory containing computer readable storage medium having stored thereon program instructions for performing a method; and
a processor coupled to the memory, the processor configured to execute the program instructions to cause the processor to:
identify a change in a primary configuration of a first node while the first node is operational, wherein primary data stored in the first node is to be backed up as backup data in a second node;
select a second node identifier of the second node as a substitute identifier for replacing a node identifier identifying the first node within the change in the primary configuration based upon a determination that the change in the primary configuration is to be used to update a backup configuration of the second node;
create an updated configuration change comprising a modified version of the change having the node identifier replaced with the substitute identifier; and
update the backup configuration of the second node based on the updated configuration change comprising the substitute identifier of the second node.

18. The computing device of claim 17, wherein the program instructions executable by the processor is to cause the processor to:
defer the update of the backup configuration using the updated configuration change and a number of changes not incorporated into updating the backup configuration until a next periodically scheduled update to the backup configuration.

19. The computing device of claim 17, wherein the program instructions executable by the processor is to cause the processor to:
establish a configuration logical connection between the first node and the second node for receiving the change in the primary configuration;

receive an update to the backup data based on a change to the primary data; and update the backup data based on the update to the backup data.

20. The computing device of claim 19, wherein the program instructions executable by the processor is to cause the processor to receive the update to the backup data through a data logical connection that is different than the configuration logical connection.

* * * * *